US012806798B2

(12) United States Patent
Gao et al.

(10) Patent No.: US 12,806,798 B2
(45) Date of Patent: Nov. 24, 2026

(54) METHODS AND PRINTED INTERFACE FOR ROBOTIC PHYSICOCHEMICAL SENSING

(71) Applicant: California Institute of Technology, Pasadena, CA (US)

(72) Inventors: Wei Gao, Pasadena, CA (US); You Yu, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 614 days.

(21) Appl. No.: 17/993,525

(22) Filed: Nov. 23, 2022

(65) Prior Publication Data

US 2023/0158686 A1 May 25, 2023

Related U.S. Application Data

(60) Provisional application No. 63/282,644, filed on Nov. 23, 2021.

(51) Int. Cl.
*B25J 9/16* (2006.01)
*B25J 13/00* (2006.01)
(Continued)

(52) U.S. Cl.
CPC ............. *B25J 13/087* (2013.01); *B25J 9/163* (2013.01); *B25J 13/006* (2013.01); *B25J 13/084* (2013.01); *B41J 2/01* (2013.01)

(58) Field of Classification Search
CPC ...... A61B 5/296; A61B 5/6811; B25J 13/087; B25J 13/006; B25J 13/084
See application file for complete search history.

(56) References Cited

U.S. PATENT DOCUMENTS 7,927,807 B1 4/2011 Fries et al.
2009/0312817 A1 12/2009 Hogle et al.
(Continued)

FOREIGN PATENT DOCUMENTS

CN 101907595 A * 12/2010
CN 109846582 A * 6/2019
(Continued)

OTHER PUBLICATIONS

Mathew et al. Facile Green Approach for Developing Electrochemically Reduced Graphene Oxide-Embedded Platinum Nanoparticles for Ultrasensitive Detection of Nitric Oxide. ACS Omega 2021 6 (12), 8068-8080. DOI: 10.1021/acsomega.0c05644 (Year: 2021).*
(Continued)

*Primary Examiner* — Eun Hwa Kim
(74) *Attorney, Agent, or Firm* — Sheppard Mullin Richter & Hampton LLP

(57) ABSTRACT

Systems and methods for an electronic skin based robotic system including a robotic interface and a human subject are provided. An e-skin may be applied to the robotic interface. The e-skin applied to the robotic interface may include a plurality of physicochemical sensors. An e-skin may also be applied to the human subject. The e-skin may include electrodes for sensing muscular contractions associated with hand and arm movements as well as electrodes for stimulation. Machine learning techniques may enable decoding of signals to control the robotic hand and arm. The robotic hand and arm may be controlled to approach unknown compounds that may be hazardous. The sensors making up the physicochemical sensors on the e-skin on the robotic hand and arm may include tactile, pressure, temperature, and chemical sensors, as well as other useful sensors. These sensors may enable detection of explosives, organophos-
(Continued)

phates, pathogenic proteins, and other hazardous compounds.

17 Claims, 7 Drawing Sheets

(51) Int. Cl.
*B25J 13/08* (2006.01)
*B41J 2/01* (2006.01)

(56) References Cited

U.S. PATENT DOCUMENTS

2012/0073992 A1* 3/2012 Kim ........................ B82Y 15/00
257/E51.023
2013/0041235 A1* 2/2013 Rogers ..................... A61N 1/05
600/386
2013/0151007 A1 6/2013 Valpola et al.
2014/0303452 A1* 10/2014 Ghaffari ................. A61B 18/20
601/3
2014/0330404 A1* 11/2014 Abdelghani ......... A61B 5/4851
700/83
2014/0332409 A1* 11/2014 Wilkins ........... G01N 33/54366
204/403.02
2016/0250015 A1 9/2016 Kim et al.
2018/0307314 A1 10/2018 Connor

FOREIGN PATENT DOCUMENTS

CN 112798665 A * 5/2021 ............. G01N 27/26
CN 112587285 B * 3/2023
WO WO-2021220127 A1 * 11/2021 ......... A61N 1/36021

OTHER PUBLICATIONS

Lee et al., Comparison of amperometric biosensors fabricated by palladium, sputtering, palladium electrodeposition, and Nafion/carbon nanotube casting on screen-printed carbon electrodes, 2007, Biosensors and Bioelectronics, 22, 887-884. (Year: 2007).*
Hguyen et al., Wearable materials with embedded synthetic biology sensors for biomolecule detection. 2021. Nat Biotechnol 39, 1366-1374 (Year: 2021).*
PCT International Search Report and the Written Opinion mailed Apr. 27, 2023, issued in related International Application No. PCT/US2022/050795 (12 pages).
You Yu et al., "All-printed soft human-machine interface for robotic physiochemical sensing", Science Robotics, vol. 7, No. 67, eabn0495. Jun. 1, 2022, pp. 1-12.

* cited by examiner

FIG. 7A
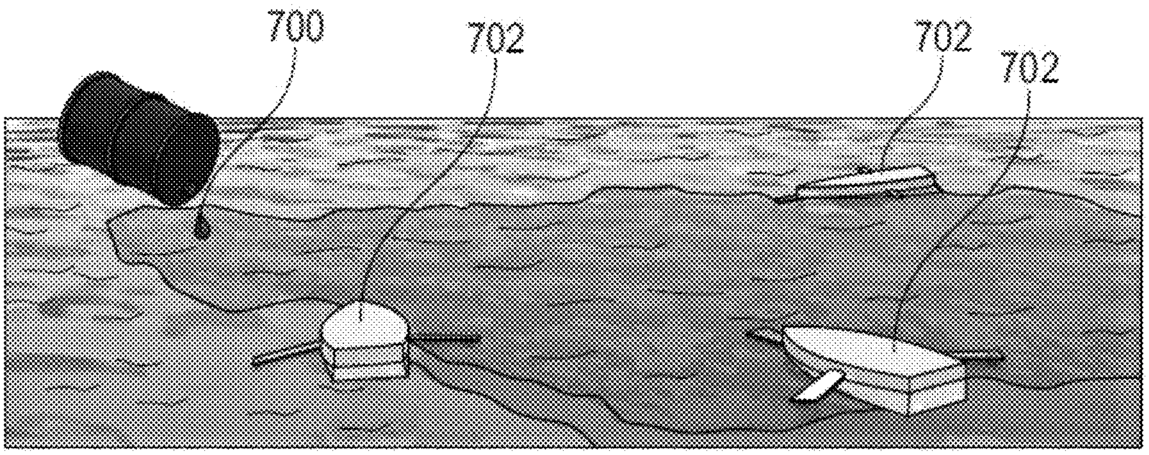
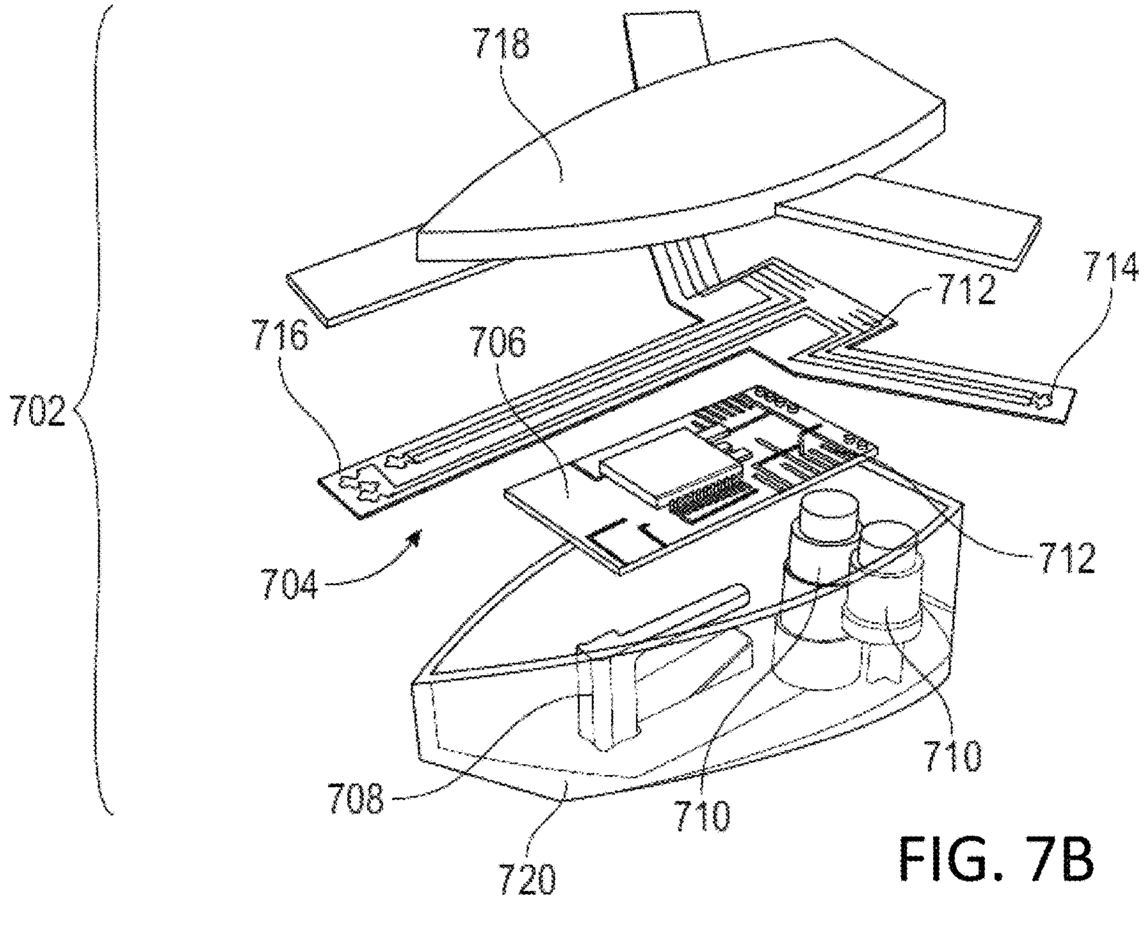
FIG. 7B

METHODS AND PRINTED INTERFACE FOR ROBOTIC PHYSICOCHEMICAL SENSING

RELATED APPLICATION

This application claims the benefit of U.S. Provisional Application No. 63/282,644 filed on Nov. 23, 2021, the contents of which are incorporated herein by reference in their entirety.

TECHNICAL FIELD

The present disclosure relates generally to systems and methods for robotic sensing. In particular, some implementations may relate to systems and methods concerning a flexible, electronic skin ("e-skin") autonomous robotic sensing system capable of performing both tactile and chemical sensing on-site, in real-time.

BACKGROUND

Autonomous robotic sensing systems offer significant advantages over human sensing capabilities. For example, robots may leverage tactile perception techniques to complete tasks while avoiding harm to the robot, robot operator, and/or surrounding environment. Additionally, robots may be equipped to detect small amounts of hazardous materials in toxic environments. Using a robot to analyze a substance on site may be more accurate and efficient than human collection and evaluation in a lab. Using a robot may also obviate the need to expose humans to potentially hazardous substances and may allow evaluation of substances in environments that are not explorable or accessible to human researches due to toxic risk.

Current robotic sensor systems do not provide seamless and efficient integration and interfacing with a human and/or robot body, thus limiting the ability for real-time operator control of the sensing system as well as real-time feedback. As such, current systems are limited in their ability to perform autonomous and/or remote tactile and chemical sensing applications in hazardous environments, including without limitation, agricultural and environmental protection applications involving chemicals, such as pesticides, linked to disease and pollution and/or security surveillance requiring the identification and/or interaction with toxic substances, explosives, and/or pathogenic biohazard.

Robot/human interface systems have also historically been difficult to fabricate and implement for a number of reasons. First, rapid detection of hazardous substances using biosensors generally requires manual, solution-based preparation steps. A human operator would need to prepare a solution to analyze a hazardous substances which could put the human operator at risk of toxic exposure. Integrating chemical sensors for autonomous on-site detection of substances into an e-skin robotic platform has also presented significant challenges. For instance, an e-skin platform having both tactile and chemical sensing ability would need to be able to appropriately handle a wide range of objects, collect samples, and carry out on-site chemical analysis. This requires highly accurate sensors. Usually, manufacturing a sensor at this accuracy level would be done via manual drop-casting modification to the nanomaterial which is labor intensive and expensive. This is not scalable. Producing sensors en-masse using conventional methods would result in too much sensor variation to effectively and safely perform chemical sensing. Combining all of the above into a flexible human-machine interface, in order to efficiently and accurately control and receive real-time operator feedback only presents additional hurdles.

SUMMARY

Systems and methods are disclosed herein for robotic multimodal physicochemical sensing. In one example, a multimodal robotic sensing system may include a robotic interface. A first printed flexible electronic skin equipped with sensors may be applied to the robotic interface. A second printed flexible electronic skin equipped with sensors may be applied to a human subject. A laser proximity sensor may be attached to the robotic interface. In one example, the robotic interface may be a robotic hand and a robotic arm connected to the robotic hand. The first printed flexible electronic skin may be applied to the robotic hand. The second printed flexible electronic skin may be applied to different parts of the human subject. For example, the flexible electronic skin may be applied to the forearm, neck, back, leg, and/or other areas. The human subject, using the second electronic skin, may control and receive feedback from the robotic arm and robotic hand.

In one example, the sensors making up a first flexible printed e-skin may be printed nanoengineered multimodal physicochemical sensors. The e-skin may also include engraved with kirigami structures. The sensors making up the second flexible printed electronic skin may be sEMG electrode arrays encapsulated with PDMS. The second e-skin may also include electrical stimulation electrodes encapsulated with PDMS.

In an example, the physicochemical sensors may include a tactile sensor or tactile sensing module. In an example, the physicochemical sensors may include a temperature sensor or a temperature sensing module. In an example, the physicochemical sensors may include an autonomous dry-phase analyte detection module. The sensor may also be configured to perform a solution-based analyte detection.

In an example, a remote robotic control method may include applying a first e-skin to a human subject. The first e-skin may include sEMG electrode arrays encapsulated with PDMS and electrical stimulation electrodes encapsulated with PDMS. A remote robotic control method may also include collecting sEMG signals from the human subject through the sEMG electrode array. The method may also include decoding the collected sEMG signals using machine learning techniques. The method may also include controlling movements of a robotic arm based on the decoded signals.

The method may include additional operations which may support an alarm feedback method. An additional operation may include moving the robotic arm into contact with an object. The robotic arm equipped with a second e-skin having physicochemical sensors. The method may also include, upon contact with the object, detecting the object with the physicochemical sensors. The method may also include determining whether the object poses a threat based on collected sensor data. The method may also include stimulating the human subject using the electrical stimulation electrodes if a threat is detected.

In one example, the method may be directed to detecting hazardous explosives. For example, the physicochemical sensors may include a Pt-nanoparticle decorated graphene electrode configured to detect TNT. In another example, the method may be directed to detecting OPs. For example, the physicochemical sensors may include a MOF-808 modified gold nanoparticles electrode configured to detect OP. In another example, the method may be directed to detecting biohazards. For example, the physicochemical sensors may include a carbon nanotube (CNT) electrode configured to detect pathogenic proteins. A pathogenic protein may be the SARs-CoV-2 virus.

In an example, an electronic skin fabrication method may include printing a silver layer for interconnects and reference electrodes using a modified inkjet printer. A method may also include printing a carbon layer counter electrode and temperature sensor layer onto the silver layer. A method may also include printing a polyimide encapsulation layer (polyamic acid printing followed by sintering to form polyimide) onto the carbon layer. A method may also include printing a target-selective nanoengineered (MOF-808) sensing layer onto the polyimide layer. The sensing film layer may include a tactile sensor and biochemical sensing electrodes. The method may also include cutting a polyimide substrate with kirigami structures by automatic precision cutting and treating the polyimide surface with O2 plasma. The kirigami structures may provide the e-skin with a high degree of flexibility and/or conformability, if applied, for example, to a robotic hand, but may maintain 100% or nearly 100% conductivity to support the sensors.

The method may also include operations directed to forming a tactile sensor. For example, the method may include printing silver nanowires (AgNWs) layers onto a nanotextured substrate to form a tactile sensor. The method may also include cutting the substrate with AgNWs printed layers into a semicircle shape and applying it to the e-skin. The method may also include operations directed to forming a protein sensor. For example, the method may include printing a CNT film onto an IPCE to form a biohazard protein sensor. The method may also include coating chemical sensors with soft gelatin hydrogel. The hydrogel may assist in sampling and detecting analytes.

In another example, a robotic boat source tracking system may include a robotic boat housing. The tracking system may also include a motor disposed within the housing configured to propel the robotic boat. The tracking system may also include a battery disposed within the housing configured to power the robotic boat. The tracking system may also include an electronic skin. The electronic skin may have a plurality of physicochemical sensors configured to perform temperature measurements, identify chemical substances, and determine the concentrations of chemical substances. The tracking system may also include a Bluetooth Low Energy (BLE) board disposed within the housing and configured to support the electronic skin. The tracking system may also include a machine learning module. The robotic boat may leverage sensor data and machine learning techniques to track a source of a chemical compound.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 7A is a diagram showing an example of a source tracking system in accordance with various embodiments of the present disclosure.

FIG. 7B is a diagram showing an example of a source tracking system in accordance with various embodiments of the present disclosure.

Figure 1A:
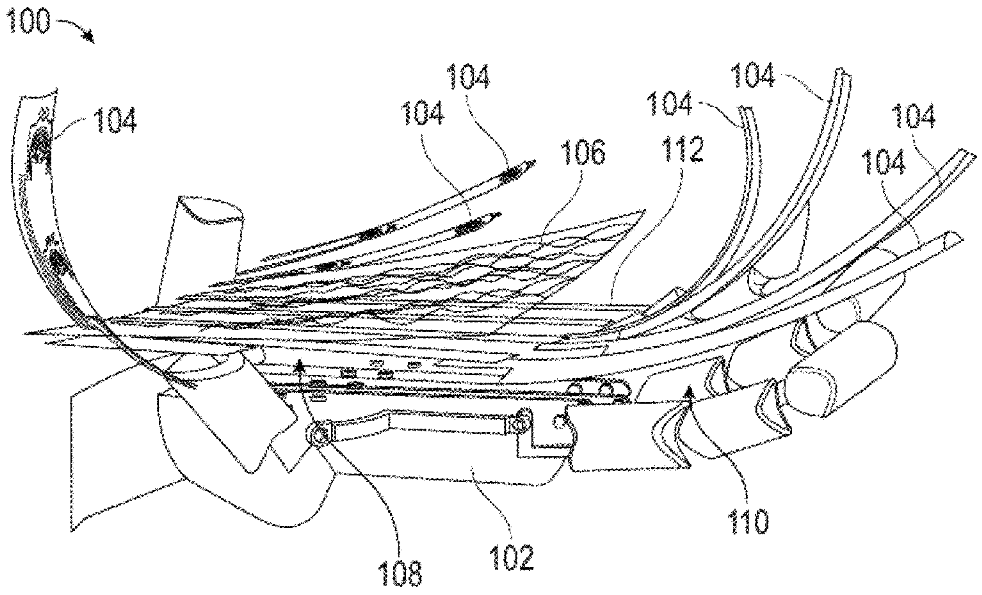
FIG. 1A is a diagram showing an example of a printed flexible electronic skin applied to a robotic hand in accordance with various embodiments of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Systems and methods are described herein relate to controllable human-machine interactive robotic interfaces. Robotic interfaces may be equipped with both physical and chemical sensing capabilities. Robotic interfaces may be configured to perform point-of-use analysis for relevant substances and environments. Robotic interfaces may be highly flexible and conformable, mimicking human skin, to form a flexible, electronic skin ("e-skin"). An e-skin may enable seamless and efficient interaction between electronics and human and/or robot bodies to improve physical and chemical sensing applications. Robotic interfaces may improve sensing in a wide variety of environments including consumer electronics, digital medicine, smart implants, environmental surveillance, and others.

Robotic E-Skin Sensing System Embodiments

In various embodiments of the present disclosure, a robotic sensing system may be configured to measure an environment using tactile, chemical, and/or temperature sensors. A robotic sensing system may include a robot. A robotic sensing system may also include a human operator. The human operator may control the robot. The human operator may also receive feedback from the robot. A robotic sensing system may make use of electronic skins ("e-skins") to measure an environment, operate a robot, and receive feedback from the robot based on environmental measurements. E-skins may be applied to the human subject as well as to the robot. The robot may take the form of a human hand and/or arm. The system including a robotic hand/arm equipped with a first e-skin and a human operator equipped with a second e-skin may communicate such that the human operator may control and receive feedback from the robot ("first" and "second" are nominal descriptors and one skilled in the art would understand that either e-skin may be designated as "first" or "second"). A robot equipped with an e-skin may also take other useful forms. For example, a robotic boat may be equipped with an e-skin.

The e-skin may be applied to the robot. The e-skin may include printed nanoengineered multimodal physicochemical sensors. The robot may be a robotic hand and/or arm. The sensors may be applied to the palm and/or fingers of a robotic hand. The sensors may be fabricated using a drop-on-demand inkjet technology. The e-skin may be engraved with kirigami structures. The kirigami structures may have a high stretchability without a conductive change. These properties may result in a high degree of freedom of movement of the robotic hand. The e-skin may leverage its physicochemical sensors to perform several measurements. For instance, the e-skin may perform proximity sensing using a laser proximity sensor. The e-skin may also sense properties of an object through a tactile sensor which may, for example, detect pressure to determine the weight of an object. The e-skin may also perform temperature measurements. The e-skin may be able to leverage its sensors, including its tactile sensors to perform a perceptual mapping. For instance, the e-skin may be able to determine the shape of an object. The robotic hand may be controlled to grasp an object, via the human subject wearing a second e-skin and controlling movement, and the e-skin applied to the robotic hand, equipped with tactile sensors, may be able to determine the shape of the object.

The e-skin may, in addition to the above described sensor types, also be equipped with chemical sensors. The chemical sensors may be able to perform both solution-phase and dry-phase sampling of compounds. The chemical sensor may be boated with a hydrogel to aid in the sampling and detection process. The e-skin may be equipped with many custom chemical sensors which may be configured to detect numerous substances including explosives, such as 2,4,6 trinitrotoluene (TNT), organophosphates (OPs) such as pesticides and chemical warfare agents, for example, sarin, and biohazard materials, such as pathogenic proteins. Pathogenic proteins may include the SARS-CoV-2 virus.

Referring now to FIG. 1A, an example of an e-skin sensor system 100 is shown. The e-skin system 100 may include a robotic hand 102. The robotic hand may be equipped with multiple e-skins. For instance, as shown, the robotic hand 102 may be equipped with e-skins on the palm 108. The robotic hand may also be equipped with e-skins on the fingers 110. The e-skins may include physicochemical sensors 104. The e-skins may also include kirigami structures 106. The kirigami structures 106 may provide flexible support such that the e-skin system remains highly conformable to the robotic hand 102 without comprising conductivity needed to power the sensors 104. The e-skins applied to the robotic hand 102 may be connected to each other with pins 112. The e-skins applied to the palm 108 and fingers 110 may together form an e-skin system of integrated physicochemical sensors 104.

Figure 1C:
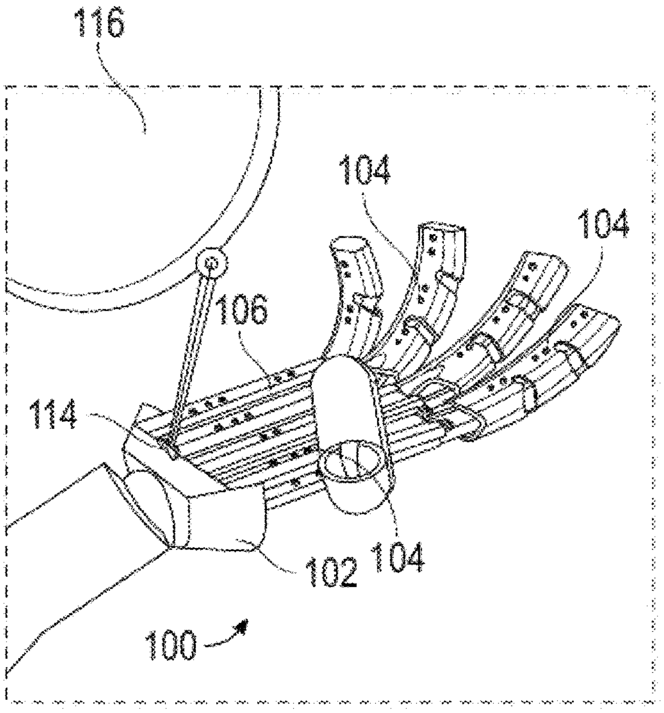
FIG. 1C is a diagram showing an example of a printed flexible electronic skin applied to a robotic hand in accordance with various embodiments of the present disclosure.
Figure 1B:
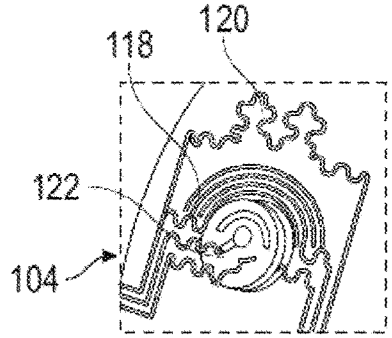
FIG. 1B is a diagram showing an example of a unit of physicochemical sensor in accordance with various embodiments of the present disclosure.

Referring now to FIG. 1B, an example of a physicochemical sensor 104 is shown. The physicochemical sensor may include a temperature sensor 120. The temperature sensor 120 may measure the actual or relative temperature of surfaces or areas that the temperature sensor 120 comes into contact with or is relatively near. The physicochemical sensors 104 may also include a tactile sensor 118. The tactile sensor 118 may measure information rising from physical interaction with its environment. For example, the tactile sensors 118 may be modeled to measure similar information as one would receive from biological sense of cutaneous touch, which is capable of detecting stimuli resulting from mechanical stimulation, temperature, and pain. The physicochemical sensor may also include a chemical sensor 122. The chemical sensor 122 may include a hydrogel layer to aid in sampling and detection of compounds. The physicochemical sensor 104 may include other types of useful sensors.

Referring now to FIG. 1C, an example of an e-skin sensor system 100 is shown. The e-skin sensor system 100 may include a robotic hand 102. The robotic hand 102 may be equipped with e-skins. The robotic hand 102 may be equipped with a palm e-skin 108. The robotic hand 102 may also be equipped with finger e-skins 108. The e-skins may include physicochemical sensors 104. The e-skins may also include kirigami structures 106. The robotic hand may also be equipped with a laser proximity sensor ("LPS") 114. The LPS may aid the robotic hand 102 in determining how close an object is to the robotic hand 102. This may protect the robotic hand 102 from damage by unexpectedly colliding with or encountering an unknown object 116.

An e-skin may be applied to a human subject. A human-applied e-skin may contain electrodes that may be configured to collect physiological data from the human subject. Physiological data collected from a human subject may be decoded using machine learning techniques to assess movement patterns or control movements, generally. Decoded data may then be used to control or manage a corresponding robot. A human-applied e-skin may also be equipped with electrodes configured to provide stimulation to a human subject. The stimulation may provide feedback to a human subject and may alert a human subject to potential threats. The feedback, signals, and/or other information/data may be transmitted between e-skins via a wireless communication module such as Wi-Fi, Bluetooth, or other transceivers and receivers included on the e-skin. For example, the wireless communication module may transmit physiological data between a first printed flexible electronic skin on a human subject and a second printed flexible electronic skin on a robot interface.

Figure 2A:
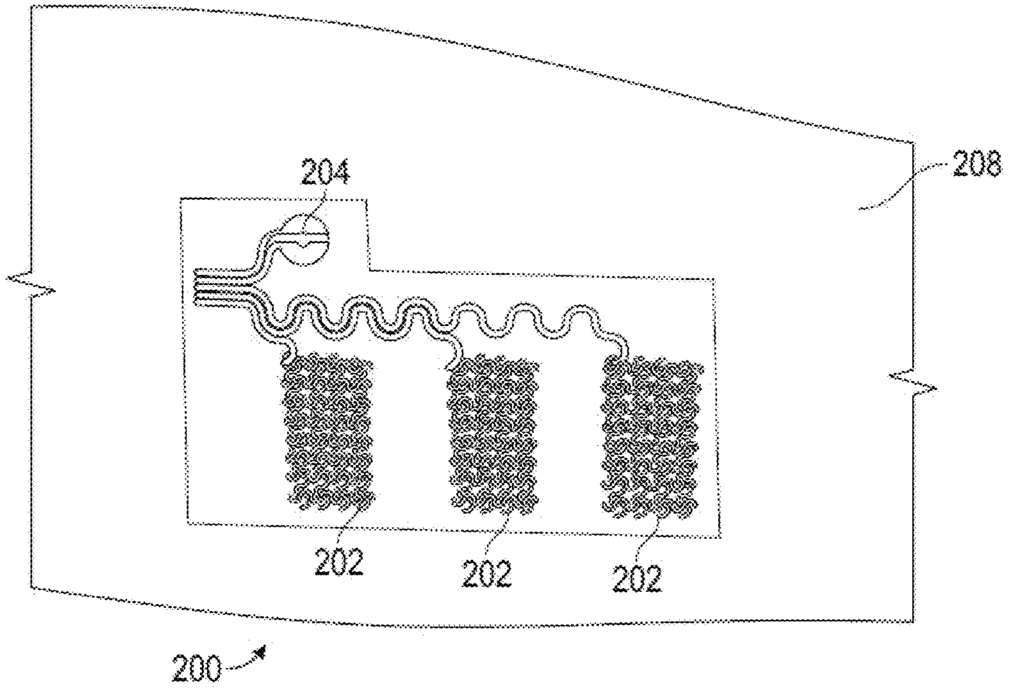
FIG. 2A is a diagram showing an example of a printed flexible electronic skin applied to a human forearm in accordance with various embodiments of the present disclosure.
Figure 2B:
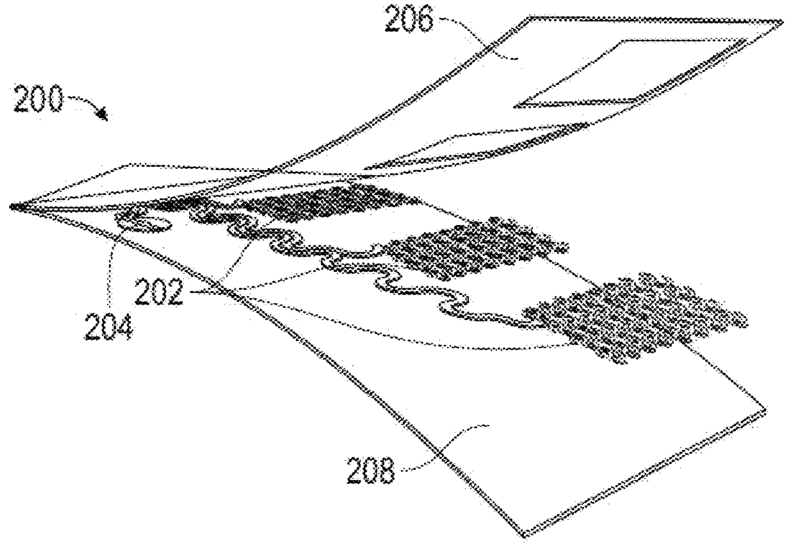
FIG. 2B is a diagram showing an example of a printed flexible electronic skin in accordance with various embodiments of the present disclosure.

Referring now to FIG. 2A an example of a human based e-skin system is shown. An e-skin 200 is applied to a human forearm 208 and/or hand. The e-skin 200 may be applied to the human forearm 208 via an adhesive, sticking gel, or other skin securing methods. The e-skin 200 includes surface electromyography ("sEMG") electrode arrays 202. As discussed below, sEMG electrode arrays 202 may measure muscle responses or electrical activity in response to a nerve's stimulation of the muscle. The e-skin also includes an electrical stimulation electrode 204. Referring now to FIG. 2B, another example of an e-skin 200 is shown. The e-skin includes an electrical stimulation electrode 204 and sEMG electrode arrays 202. The e-skin also includes a stretchable polydimethylsiloxane (PDMS) substrate layer 208. The electrical stimulation electrode 204 and the sEMG electrode arrays 202 may be printed onto the PDMS substrate layer 208. The e-skin also includes an encapsulation PDMS layer 206 to protect and encapsulate the electrodes.

The sEMG electrode arrays 202 collect signals generated from muscular contractions of the human subject. The collected signals may be analyzed using machine learning techniques and artificial intelligence ("AI") techniques to categorize, understand, and predict human motions. These human motions may then be used to control a robotic hand. A robotic hand equipped with an e-skin having physicochemical sensors, as discussed with reference to FIGS. 1A, 1B, and 1C, above, may be integrated, controlled, and/or managed with a human applied e-skin. A human, via muscle contractions, may control the robotic hand. The robotic hand may encounter objects and may, via the physicochemical sensors, detect properties of the objects. The robotic hand may determine that an object poses a threat. In the event that the robotic hand determines an object poses a threat, feedback may be delivered to the human operator. The human applied e-skin, equipped with electrical stimulation electrodes, may, upon receiving a threat signal, via the wireless communication module, from the robotic hand sensors, deliver stimulation to the human subject. Stimulation may be delivered in real-time, as if the human subject were directly encountering the object.

Figure 3:
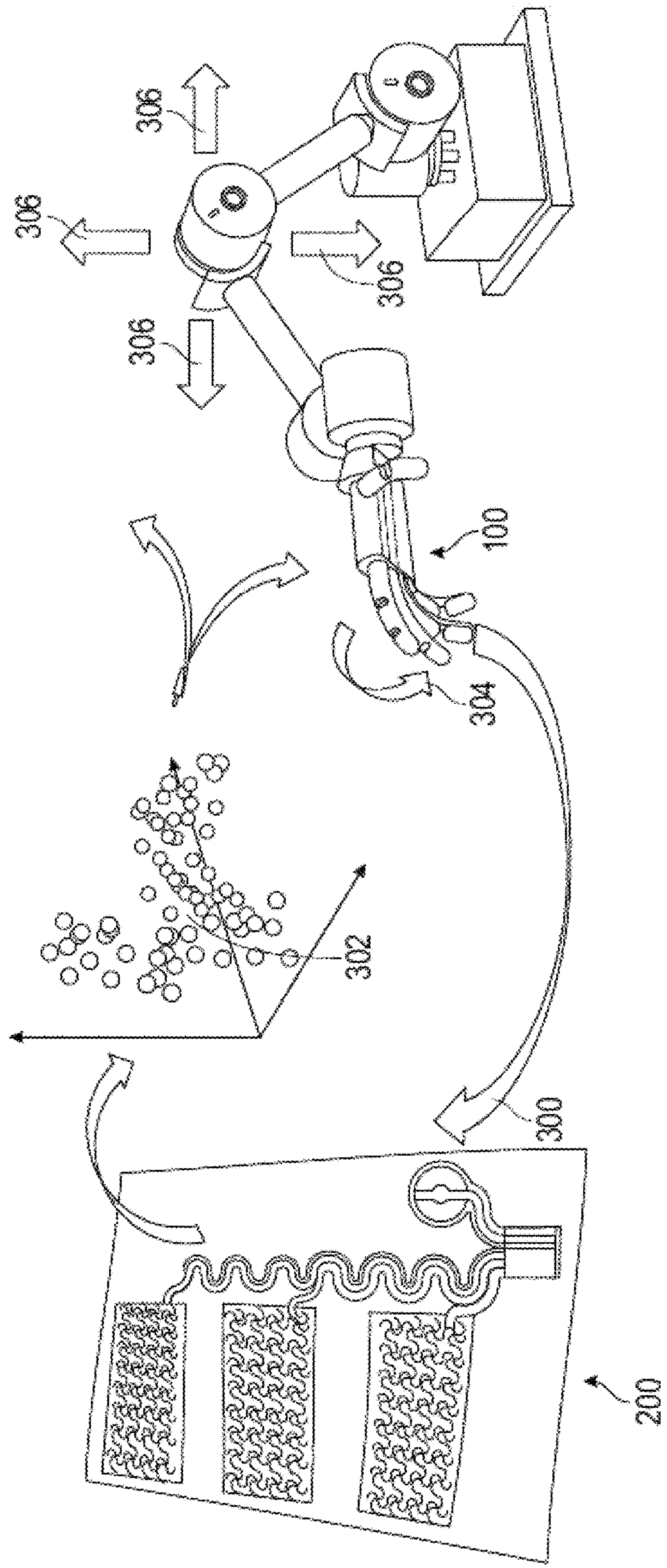
FIG. 3 is a diagram showing an example of a robotic sensing system in accordance with various embodiments of the present disclosure.
Figure 4A:
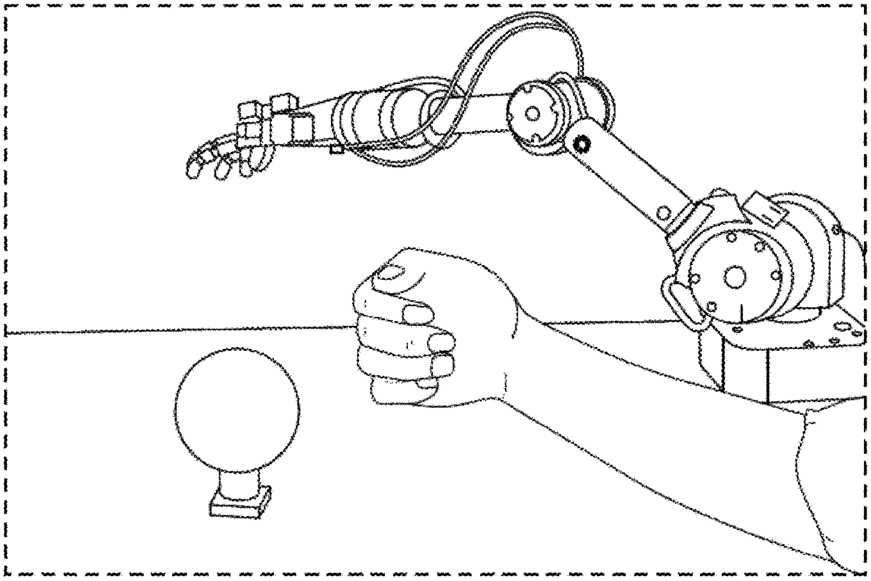
FIG. 4A is a diagram showing an example of a robotic sensing system in accordance with various embodiments of the present disclosure.
Figure 4B:
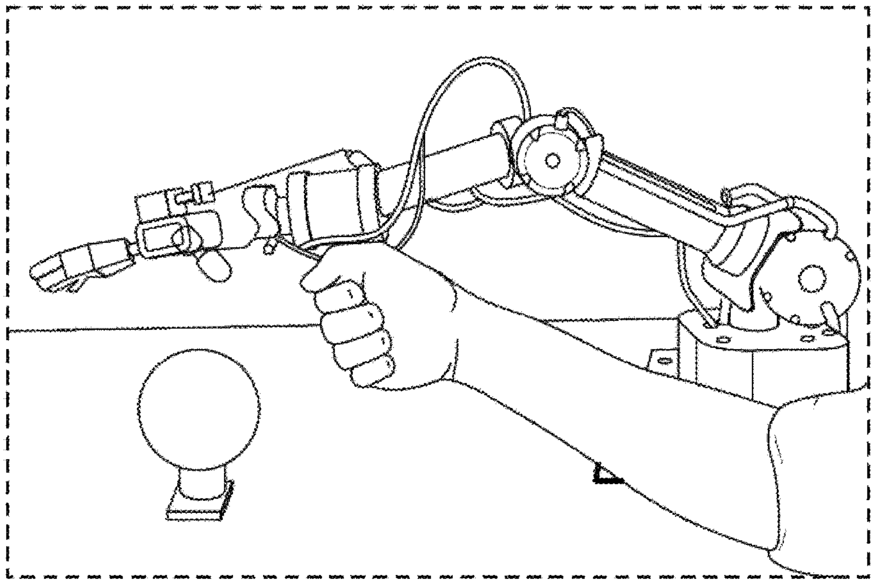
FIG. 4B is a diagram showing an example of a robotic sensing system in accordance with various embodiments of the present disclosure.
Figure 4C:
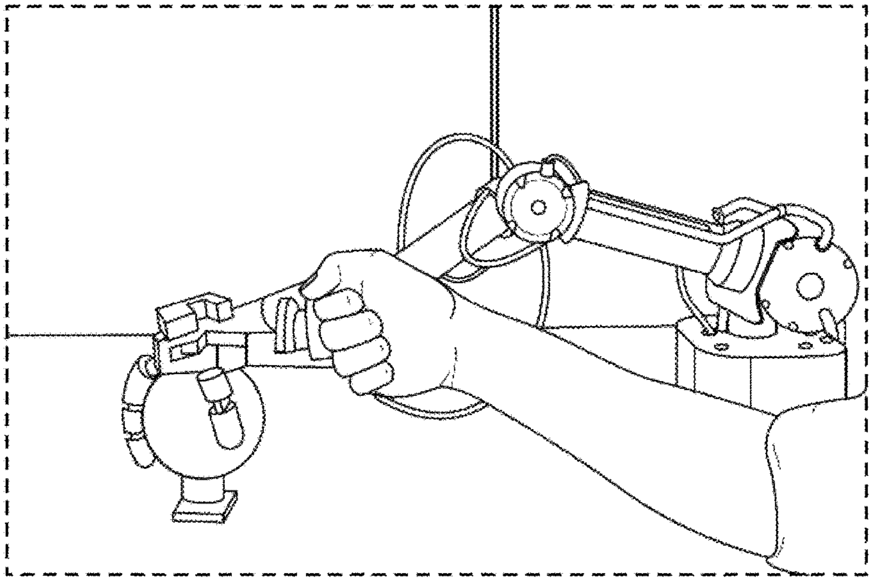
FIG. 4C is a diagram showing an example of a robotic sensing system in accordance with various embodiments of the present disclosure.

Referring now to FIG. 3, an example of a system integrated with the robot applied e-skins of FIGS. 1A, 1B, and 1C, as well as the human applied e-skin of FIGS. 2A and 2B, is shown. The system includes a human applied e-skin 200, as described above. The system also includes a robotic hand/arm system 100, as described above. Communication between a human subject and the robot, through the e-skins, may enable the robot to perform several maneuvers including grabbing 304 and moving directions 306. The system may move directions 306 via rotational or translational motors controlled by the movement of the human applied e-skin 200. Additionally, the system can continue to learn and improve control of the robot through decoding human movements leveraging machine learning techniques 302. The machine learning techniques 302 may graph, average, or otherwise compute various movements to improve future movements, based on past movement predictions. For example, repeated movements that result in pushing an object may be graphed based on successful actuations, allowing for faster, similar movements to be executed on future iterations of similar movements. FIGS. 4A, 4B, and 4C show additional examples of an integrated human-robot e-skin system in which a human operator controls the robot and enables the robot to move in a direction (FIG. 4A), open fingers to prepare to grasp an object (FIG. 4B), and grasp an object (FIG. 4C).

Figure 5:
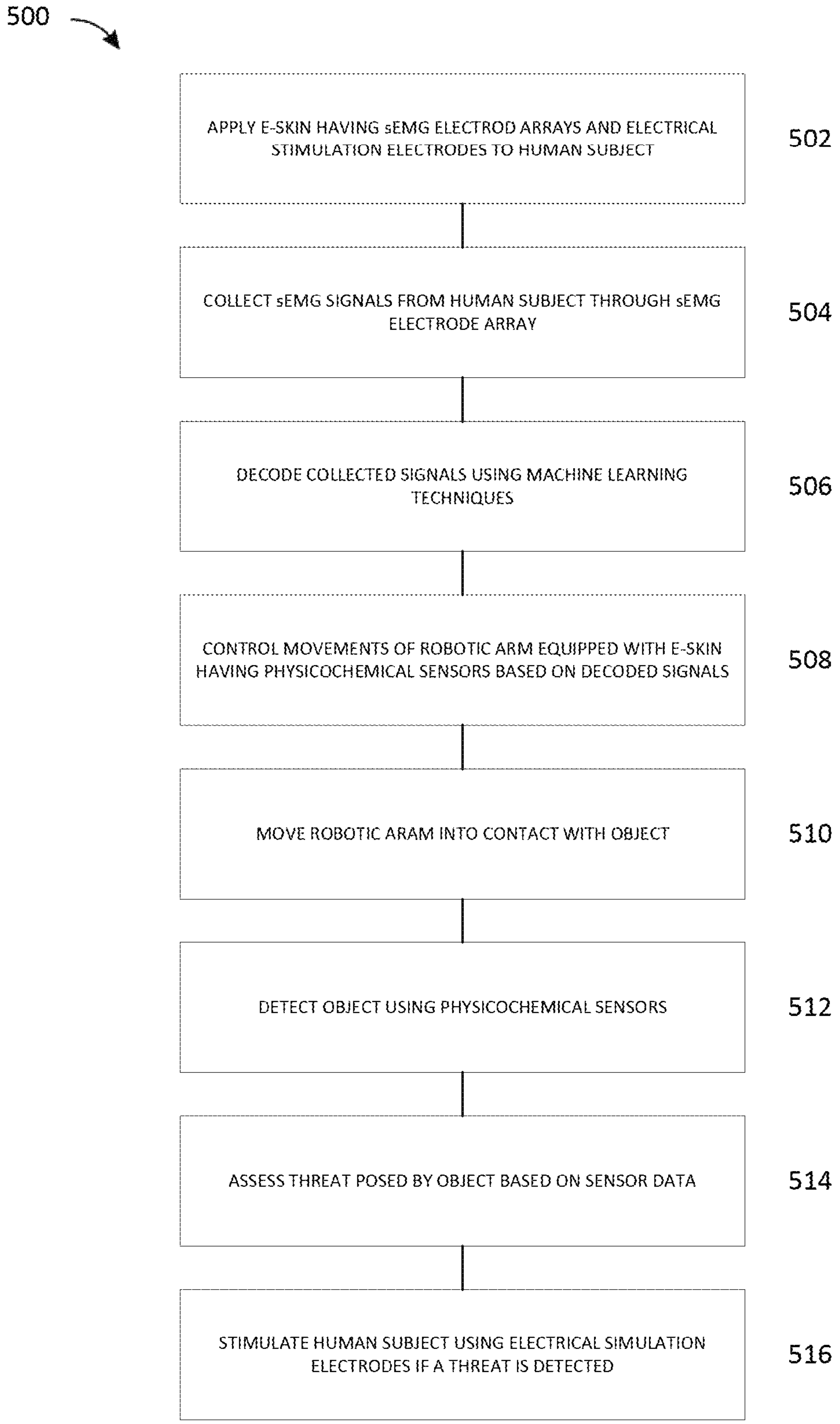
FIG. 5 is a flow diagram showing an example of a method for robotic control and alarm feedback in accordance with various embodiments of the present disclosure.

Referring now to FIG. 5, an example method for controlling a robot and receiving feedback 500 is shown. A first operation 502 may include applying an e-skin to a human subject. The e-skin may be equipped with sEMG electrode arrays and electrical stimulation electrodes. A second operation 504 may include collecting sEMG signals from a human subject through the sEMG electrode array. In particular, the sEMG electrode array may detect signals associated with muscular contractions of the human subject as the human subject performs a motion. A third operation 506 may include decoding the collected signals using machine learning techniques. A fourth operation 508 may include controlling the movements of the robot based on the decoded signals.

The robot may be equipped with an e-skin which may be equipped with physicochemical sensors. A fifth operation 510 may include moving a robotic arm in contact with an object and then grasping the object, as shown in FIGS. 4A, 4B, and 4C. A sixth operation 512 may include detecting an object and its properties using physicochemical sensors. For instance, the type of chemical compound may be detected. The concentration of a chemical compound may also be detected. Other properties of objects, such as size, shape, weight, temperature, and other properties, may also be detected. A seventh operation 514 may include determining whether the detected object poses a threat based on the collected sensor data. An eighth operation 516 may include stimulating a human subject using electrical stimulation electrodes if a threat is detected. This provides real-time haptic feedback to the human subject as if the human subject were touching the substance.

Such a method may be useful in a variety of contexts. For example, the physicochemical sensors may include a Pt-nanoparticle decorated graphene electrode. This electrode may be effective for detecting explosive compounds, such as TNT. The robot hand may be able to contact and detect the compound while the human operator controls the robot from a safe distance. In another example, the physicochemical sensors may include a MOF-808 modified gold nanoparticle electrode. This electrode may be effective for detecting OPs such as pesticides or chemical warfare agents. OPs can be incredible dangerous to human beings. Contact may cause disease or even death. Using the robot to identify and detect an OP prevents putting a human operator at risk. In another example, the physicochemical sensors may include a carbon nanotube (CNT) electrode. This electrode may be effective for detecting pathogenic proteins and other biohazards. For example, a CNT electrode may be effect for detecting the SARS-CoV-2 virus. The robotic hand may be able to detect the virus and provide immediate feedback to a human subject while a human subject remains at a safe distance to avoid contagion.

Inkjet Printer Fabrication Embodiment

Figure 6:
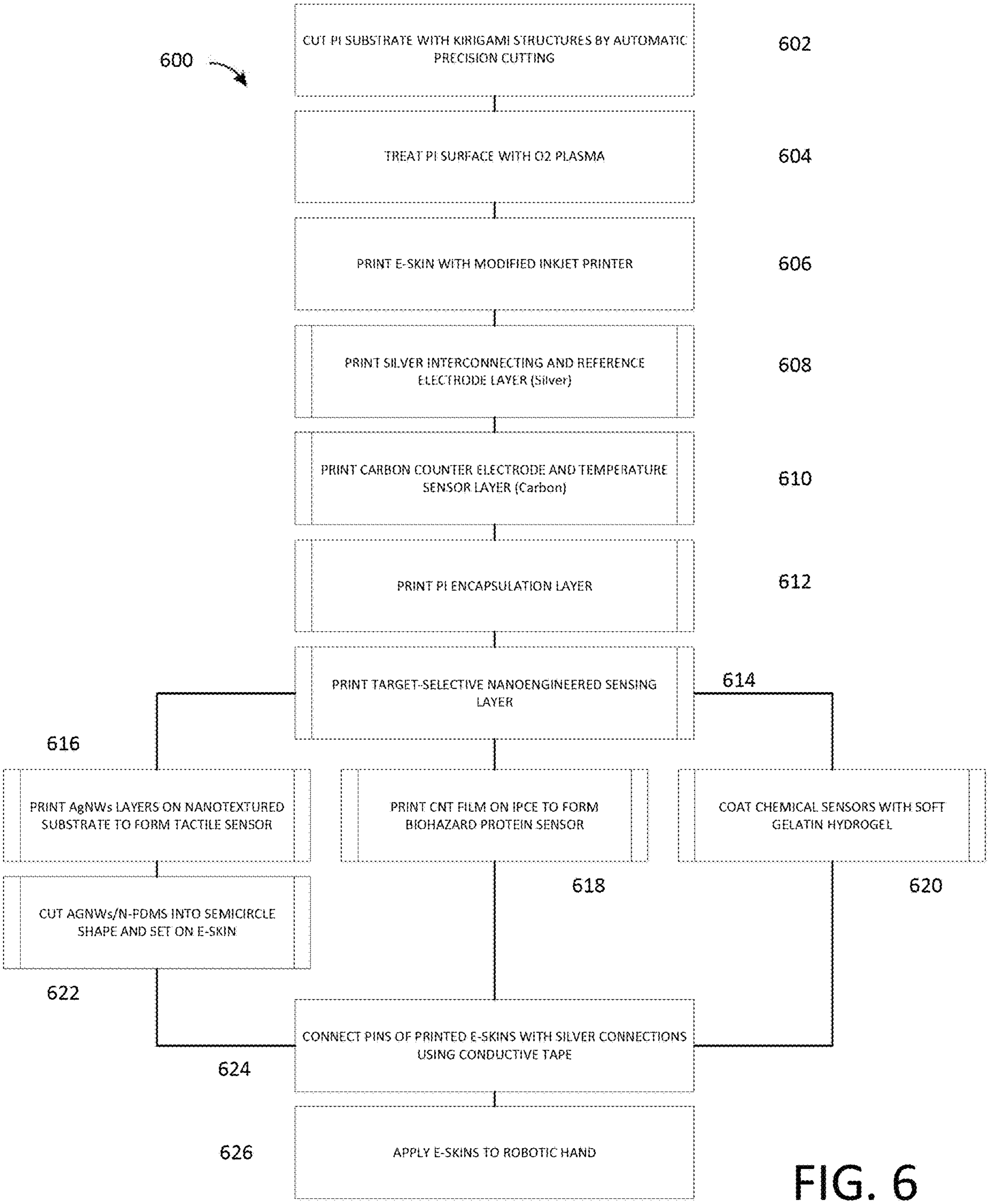
FIG. 6 is a flow diagram showing an example of a method for printing an e-skin in accordance with various embodiments of the present disclosure.

Many of the above discussed embodiments include flexible printable e-skins. E-skins, including electrodes and/or sensors, may be printed using a modified inkjet printer. Printing e-skins with a modified inkjet printer is highly advantageous because it allows e-skins to be easily produced in large quantities at a low cost. Referring now to FIG. 6, an example method for making e-skins 600 is shown. A first operation 602 may include cutting a polyimide ("PI") substrate with kirigami structures by automatic precision cutting. Kirigami structures allow for a highly flexible e-skin without sacrificing conductivity. As a second operation 604, the PI surface may be treated with O2 plasma.

Next, a third operation 606 may include a substrate being printed using a serial printing method with a modified inkjet printer. The substrate may support sensors and may be integrated with the kirigami structures to form a soft flexible e-skin. First, a silver layer of the substrate may be printed 608. The silver layer may serve an interconnecting purpose. For instance, the silver layer may include pins to connect e-skins to other e-skins or other interfaces, such as circuitry or power sources. The silver layer may also include reference electrodes. Next, a carbon layer may be printed on top of the silver layer 610. A polyimide encapsulation layer may be printed on the top of silver layer 612. The carbon layer may include counter electrodes. The carbon layer may also include a temperature sensor layer. In some embodiments, a gold nanoparticles layer (AuNPs) may be printed on top of the carbon layer 612. Finally, a target-selective nanoengineered sensing layer (MOF-808) may be printed on top of the PI layer 614. This layer may allow for detection of hazardous compounds, such as OPs.

Additionally, a tactile and/or pressure sensor may also be printed. Layers of silver, for example, AgNWs, may be printed on top of a nanotextured PDMS substrate 616. In one embodiment, 30 AgNWs layers may be printed to form the tactile sensor. Next, the printed AgNWs-PDMS may be cut into a semicircle shape and set onto the e-skin 622. A protein sensor to detect biohazards may also be included. The protein sensor may be printed on CNT film 618. The CNT film may be printed onto inkjet printed carbon electrodes ("IPCE"), as discussed above. Chemical sensors, such as the protein sensor and the OP sensor, may be coated with a flexible gelatin hydrogel 620 to aid in the collection of samples of compounds.

The e-skin may be completed by connecting pins of e-skins with silver connection pins 624. For instance, as described above, a robotic hand may have a palm e-skin and finger e-skins. These e-skins may be interconnected with silver pins. The connection may be secured by applying conductive tape. Finally, the completed e-skins may be applied to a robotic hand to detect compounds 626.

Source Tracking Embodiment

In addition to human-robot interfaces, e-skins may have other applications. For instance, an e-skin may be applied to a robotic boat to detect the source of a leak. E-skins may also be applied to and/or used in conjunction with other robots.

Referring now to FIG. 7A, an example is shown of several boats having e-skins 702. The boats 702 may be used to detect the source of a leak 700. Referring now to FIG. 7B, an example of a robotic boat 702 is shown. The robotic boat may include a housing. The housing may have an upper component 718 and a lower component 720. The robotic boat may also include motors 710. The motors may propel the robotic boat. The robotic boat may also include a battery 708 to power the robotic boat. The robotic boat may also include a Bluetooth low energy ("BLE") circuit 706 connected to the battery. The robotic boat may also include an e-skin 704 connected to and regulated by the BLE circuit 706. The e-skin 704 may be connected to the BLE circuit 706 via connecting pins 712. The e-skin may include several sensors. For example, the e-skin may include a temperature sensor 716. The e-skin may also include another sensor 714. The other sensor or sensors may be chemical sensors. These sensors may be configured to identify chemical compounds and/or detect the concentrations of chemical compounds.

In an embodiment, robotic boats equipped with e-skins may leverage machine learning techniques to detect the source of the leak. The boats may perform measurements and communicate with each other to advance toward a point having a high or higher concentration of compounds and/or a fluid flow consistent with being the point of origin of a leak of compounds. The robots may perform this process autonomously and may transmit a signals when they have identified the origin of a leak.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A multimodal robotic sensing system, comprising:

a robotic interface, wherein the robotic interface comprises a robotic hand having a palm and a plurality of fingers, and a robotic arm connected to the robotic hand;

a plurality of flexible electronic skins applied to the robotic interface, wherein the plurality of flexible electronic skins comprises:

a first substrate layer extending along the palm and the plurality of fingers of the robotic interface comprising a first set of physicochemical sensors and electrodes along the plurality of fingers;

a first encapsulation layer configured to cover the first set of physicochemical sensors and electrodes and the first substrate layer;

a second substrate layer extending along the palm of the robotic interface comprising a second set of physicochemical sensors and electrodes; and a second encapsulation layer configured to cover the second set of physicochemical sensors and electrodes and the second substrate layer;

a second printed flexible electronic skin adapted to be applied to a human subject, wherein the second printed flexible electronic skin comprises a substrate layer, an array of surface electromyogram (sEMG) electrodes and electrical stimulation electrodes, and a second encapsulation layer covering portions of the array of sEMG electrodes including interconnects, wherein the second encapsulation layer is a polydimethylsiloxane (PDMS) layer; and a wireless communication module configured to transmit information between the plurality of printed flexible electronic skins and the second printed flexible electronic skin to transmit sEMG signals from the second printed flexible electronic skin representative of controlled movement of the robotic interface and transmit a threat signal from the plurality of printed flexible electronic skins based on collected sensor data from the first and second sets of physicochemical sensors and electrodes indicative that an object contacted by the robotic interface poses a threat, wherein the threat signal is configured to cause stimulation of the human subject via the electrical stimulation electrodes.

2. The system of claim 1, wherein the first and second substrate layers is a polyimide layer comprising engraved plurality of kirigami structures to provide stretchability.

3. The multimodal robotic sensing system of claim 1, wherein the second printed flexible electronic skin is adapted to be applied to a human forearm of the huma subject such that the human forearm controls and receives feedback from the robotic arm connected to the robotic hand.

4. The multimodal robotic sensing system of claim 1, wherein the sEMG electrode arrays and the electrical stimulation electrodes are printed onto the substrate layer.

5. The multimodal robotic sensing system of claim 1, wherein the first and second sets of physicochemical sensors and electrodes further comprises a tactile sensor configured to detect pressure to determine a weight of the object contacted by the robotic interface, wherein the tactile sensor is further configured to perform a perceptual mapping.

6. The multimodal robotic sensing system of claim 1, wherein the first and second sets of physicochemical sensors and electrodes comprises a temperature sensor configured to measure an actual or relative temperature of surfaces that the temperature sensor comes into contact with.

7. The multimodal robotic system of claim 1, wherein the first and second sets of physicochemical sensors and electrodes further comprises an autonomous dry-phase analyte detection module.

8. The multimodal robotic system of claim 1, further comprises a machine learning module, wherein the robotic interface leverages by decoding human movements to improve movement of the robotic interface, wherein the machine learning module is further configured to graph, average, or compute movements of the robotic interface based on past movement predictions to improve future movements of the robotic interface.

9. A multimodal robotic sensing system, comprising:

a robotic interface, wherein the robotic interface comprises a robotic hand having a palm and a plurality of fingers, and a robotic arm connected to the robotic hand;

a plurality of flexible electronic skins applied to the robotic interface, wherein the plurality of flexible electronic skins comprises:

a first substrate layer extending along the palm and the plurality of fingers of the robotic interface comprising a first set of physicochemical sensors and electrodes along the plurality of fingers;

a first encapsulation layer configured to cover the first set of physicochemical sensors and electrodes and the first substrate layer;

a second substrate layer extending along the palm of the robotic interface comprising a second set of physicochemical sensors and electrodes; and a second encapsulation layer configured to cover the second set of physicochemical sensors and electrodes and the second substrate layer;

a second printed flexible electronic skin adapted to be applied to a human subject, wherein the second printed flexible electronic skin comprises a substrate layer, an array of surface electromyogram (sEMG) electrodes and electrical stimulation electrodes, and an encapsulation layer covering portions of the array of sEMG electrodes including interconnects, wherein the encapsulation layer is a polydimethylsiloxane (PDMS) layer; and a wireless communication module configured to transmit information between the plurality of printed flexible electronic skins and the second printed flexible electronic skin.

10. The multimodal robotic sensing system of claim 9, wherein the first encapsulation layer and the second encapsulation layer comprise polyimide.

11. The multimodal robotic sensing system of claim 9, wherein the communication module comprises a wireless transceiver configured to transmit sEMG signals from the second flexible electronic skin to control movement of the robotic interface and transmit a threat signal from the plurality of flexible electronic skins configured to cause stimulation of the human subject via the electrical stimulation electrodes.

12. The multimodal robotic sensing system of claim 9, wherein the first set of physicochemical sensors and electrodes comprises a tactile sensor comprising silver nanowire layers printed on the first substrate layer, wherein the tactile sensor comprises a plurality of printed silver nanowires (AgNW) layers cut into a semicircle shape for application to the first substrate layer.

13. The multimodal robotic sensing system of claim 9, wherein the first set of physicochemical sensors and electrodes comprises a hydrogel sampling layer comprising a soft gelatin hydrogel coating a chemical sensor to facilitate dry-phase and solution phase analyte collection.

14. The multimodal robotic sensing system of claim 9, wherein the first set of physicochemical sensors and electrodes comprises a platinum-nanoparticle decorated graphene electrode configured to detect 2,4,6-trinitrotoluene (TNT).

15. The multimodal robotic sensing system of claim 9, wherein the first set of physicochemical sensors and electrodes comprises a target-selective nanoengineered (MOF-808) gold.

16. The multimodal robotic sensing system of claim 9, wherein the first set of physicochemical sensors and electrodes comprises a carbon nanotube film electrode printed onto an inkjet printed carbon electrode (IPCE) to detect pathogenic proteins.

17. The multimodal robotic sensing system of claim 9, wherein the second flexible electronic skin is configured to stimulate the human subject using the electrical stimulation electrodes in response to a threat signal received via the communication module.

* * * * *